(12) United States Patent
Scherer

(10) Patent No.: US 6,913,539 B1
(45) Date of Patent: Jul. 5, 2005

(54) FLEXIBLE DRIVE SHAFT LINER

(75) Inventor: George Scherer, Binghamton, NY (US)

(73) Assignee: B.W. Elliott Manufacturing Co., Inc., Binghamton, NY (US)

(*) Notice: Subject to any disclaimer, the term of this patent is extended or adjusted under 35 U.S.C. 154(b) by 0 days.

(21) Appl. No.: 10/184,410

(22) Filed: Jul. 1, 2002

(51) Int. Cl.⁷ ............................. F16D 3/12; F16C 1/20
(52) U.S. Cl. ........................... 464/51; 464/52; 464/57; 464/60; 74/502.5
(58) Field of Search ...................... 30/276; 74/500.5, 74/502.5; 464/51, 52, 57, 58, 59, 60

(56) References Cited

U.S. PATENT DOCUMENTS

| | | | | |
|---|---|---|---|---|
| 4,953,294 A | * | 9/1990 | Dohse | 30/276 |
| 5,175,932 A | * | 1/1993 | Lange et al. | 30/276 |
| 5,364,307 A | * | 11/1994 | Shaulis | 464/52 |
| 5,839,961 A | * | 11/1998 | Andress | 464/52 |
| 6,434,837 B1 | * | 8/2002 | Fogle | 30/347 |

FOREIGN PATENT DOCUMENTS

DE 3021533 A * 12/1981 ............ 464/52

* cited by examiner

Primary Examiner—Daniel P. Stodola
Assistant Examiner—Victor MacArthur
(74) Attorney, Agent, or Firm—Mark Levy & Associates; David L. Banner

(57) ABSTRACT

A flexible, rotating drive transmission assembly having a substantially spiral-shaped liner supporting a center, rotatable, flexible shaft. The liner and its center shaft are carried within an outer down-tube. The spiral-shaped liner contains flexible, continuously tapering, elliptical legs that are self-adjusting and allow the liner to be easily inserted into and firmly retained by the outer down-tube. The self-adjusting legs of the liner conform to the inside diameter of the outer down-tube despite internal variations, thus allowing the liner to maintain its central axis or centerline relative to the central axis of the outer down-tube and end components attached to the assembly. The legs provide vibration isolation and absorption by their inherent spring effect. Moreover, grease skived from the inner wall of the outer down-tube, due to the auger effect of the rotating flexible shaft, is uniformly collected in pockets for distribution along the entire length of the outer down-tube.

16 Claims, 3 Drawing Sheets

FLEXIBLE DRIVE SHAFT LINER

FIELD OF THE INVENTION

This invention pertains to flexible drive shafts for weed trimmers and other rotary drive transmission systems and, more particularly, to a flexible liner that centers the flexible shaft within the down-tube allowing for proper axial alignment of the flexible shaft with respect to the mating engine and the cutting head.

BACKGROUND OF THE INVENTION

Flexible shafts are used for mechanical rotary power drive systems serving a wide range of products, like garden tools, aerospace activation systems, construction equipment, medical devices, and automotive applications. Flexible shafts are commonly used in gasoline powered weed trimmers. The rotating flexible shaft operates inside the outer down-tube, which is an external steel or aluminum outer tube placed between the gasoline engine or electric motor and the cutting head comprising the nylon string cutting line. A casing assembly, more commonly known within the weed trimmer industry as a "liner," is located between the rotating flexible shaft and this external down-tube. The liner serves several purposes.

This extruded liner conforms to the inside diameter of the down-tube, through both the straight and curved or bend section(s) of the outer down-tube. The liner supports and centers the flexible shaft within the down-tube allowing proper axial alignment of the flexible shaft with respect to the mating engine and cutting head, and the liner acts as a bearing or wear surface for the rotating flexible shaft.

The liner usually comprises a metallic and/or a plastic composition. Over the past decade, the industry has switched almost universally to a star-shaped, all-plastic design due to its lower cost and reduced weight. This current plastic design is produced two ways: as a single extrusion or as a co-extrusion. The single extruded design presently uses a high temperature 6/6 nylon material. The co-extruded design presently uses an inner tube made from high temperature 6/6 nylon material over which a polypropylene star shape is extruded.

The conventional star-shaped liner configuration creates a number of manufacturing and performance problems for weed trimmer manufacturers. The steel outer down-tube, as well as the nylon liner, is produced within standard manufacturing tolerances, wherein the tolerance extremes of the two components either provide an excessively tight fit or an excessively loose interference fit with respect to each other. In the tight fit condition, the star-shaped straight leg profile of the liner has its legs radially emanating from the center, not allowing for sufficient leg flexure. This excessively tight interference fit between the two components can: a) prevent insertion altogether of the liner into the down-tube or b) require a forced insertion where the radially placed legs buckle non-uniformly during insertion. This buckle effect pushes the axis of the liner and flexible shaft off-center, creating a parallel misalignment condition between the flexible shaft and it's mating end components. This results in excessive wear, heat, and premature failure of the rotating flexible shaft under dynamic operating conditions.

On the other hand, excessive clearance, allowing a loose fit, creates a problem in which the liner will slip or shift axially with respect to the outer down-tube during operation, allowing disengagement of the flexible shaft. This undesirable condition requires additional and costly manufacturing steps in order to permanently retain the loose liner within the outer down-tube assembly.

In addition, it is critical that a flexible shaft be adequately lubricated to achieve its anticipated life expectancy. During assembly, the flexible shaft's entire length is uniformly lubricated with grease prior to insertion into the nylon inner tube of the liner. During operation, the helically wound wires of the rotating flexible shaft create a screw effect which will skive grease from the conventional, smooth, cylindrical wall of the liner's inner tube, resulting in the auguring of the grease toward the lower end of the flexible shaft assembly. This allows the upper end of the flexible shaft to lose grease. Eventually, this dry condition will cause failure of the flexible shaft.

The present invention is an improvement over the "state of the art" for both single extruded and co-extruded star liners and other similar liners using plastic or metallic materials.

This invention features a flexible spiral liner of plastic. Although specifically designed for a weed trimmer, it can also be used in other related applications, including but not limited to hand-held snow blowers, power brooms, lawn edgers, hedgers, pruners, chain saws, blowers/vacuums and automotive applications. The spiral liner design of this invention is structurally different from the common star-shaped liner, as illustrated in Table I, below.

TABLE I

| Elements | Conventional Star Shaped Liner | Inventive Spiral Liner |
| --- | --- | --- |
| Cross sectional shape of leg | Straight | Elliptical |
| Cross sectional leg position | Radial from Center Axis | Tangent to Inner Tube OD |
| Axial placement of legs | Longitudinal | Helical |
| Cross sectional shape of inner tube | Cylindrical | Non-cylindrical (Triangular-like, or other shape) |

The dimensional size of the inside diameter, outside diameter, wall thickness, and number of legs of the liner in this invention is dependent on application requirements.

The advantages of the spiral liner in this invention are that its flexible legs self-adjust, wherein the liner's elliptical legs will readily compress and conform to the inside diameter of the down-tube despite internal tolerance variations of the two components; its inherent flexibility provides pressure for axial retention of the liner within the outer down-tube, thus eliminating the need for a secondary means of retention; its unique spiral design and flexible legs uniformly center and support the flexible drive shaft on its intended centerline, preventing parallel misalignment with mating end components and premature failure of the flexible shaft during operation; its unique spiral design conforms to the internal diameter within the formed radius bend of the down-tube, thus preventing distortion of the liner; it is easier to insert into the down-tube; its non-cylindrical tube I.D. maintains a uniform distribution of grease along the entire length of the flexible shaft due to grease retention in the helical pockets of the liner; and its improved vibration isolation due to the inherent spring effect of the liner legs.

The foregoing advantages are accomplished by the novel structure of the elliptical shape of the liner legs, vis-a-vis a straight liner leg, which allows flexure in the down-tube providing a desirable interference fit; the leg placement, emanating tangentially from the outside diameter of the nylon tube, vis-a-vis the legs radiating from the centerline of the star-shaped liner, provides a second flexure point. This has a desirable spring effect, both effective and uniform under all tolerance stack-up conditions.

The liner assembly features a triangular-like cross-sectional inner tube disposed within the elliptically shaped legs of the liner. Three longitudinal helical corners, or pockets, are created within this assembly. These pockets retain grease along the entire length of the inner tube, as aforementioned. The grease skived from the liner wall due to the auger effect of the rotating flexible shaft is uniformly collected in these longitudinal pockets located along its entire length. This retards the propagation of the grease to the lower end, allowing the grease to be more uniformly distributed, and maintaining lubrication along the full length of the flexible shaft for the duration of its expected life. During operation, friction of the rotating flexible shaft elevates the temperature of the grease. The grease will soften, thus allowing it to be dispensed more uniformly from the three longitudinal pockets to the flexible shaft. This design eliminates the need for re-lubrication of the flexible shaft during its life expectancy.

DISCUSSION OF RELATED ART

In U.S. Pat. No. 4,112,708 issued to Fukuda on Sep. 12, 1978, for FLEXIBLE DRIVE CABLE, a drive cable is shown for a motor vehicle. The cable comprises a torque-transmitting core member and a tubular liner supporting the core member. A tubular outer member holds the liner. In one embodiment of this flexible drive shaft the core member is supported by several helically wound coils comprising closely wrapped strands of wire.

SUMMARY OF THE INVENTION

In accordance with the present invention, there is provided an improved, flexible, rotating drive transmission assembly. The improved transmission assembly comprises a substantially spiral-shaped liner comprising a triangular-like cross-section tube and elliptical legs supporting a flexible shaft. The liner and its center flexible shaft are carried within an outer down-tube. The spiral-shaped liner comprises flexible, tapering legs that are self-adjusting and allow the liner to be easily inserted into the outer down-tube. The self-adjusting legs of the liner conform to the inside diameter of the outer down-tube despite internal tolerance variations. The liner maintains its centerline relative to the centerline of the outer down-tube.

The leaf spring effect of the elliptical leg profile, the subsequent decreasing profile thickness of the legs, and the spring lever effect due to tangential placement of the leg on the inner tube all aid leg flexibility.

The self-centering feature of the liner within the outer down-tube is due to the uniform leaf spring and lever spring effects. The helical leg design provides uniform centering of the legs in both the straight and bend sections of the outer down-tube, as opposed to the buckling effect that occurs in the prior art star liner, especially in the bend section and two ends of the assembly.

The leaf spring and lever spring effects, as well as the decreasing profile thickness of the legs, help to absorb and reduce vibration.

The helical leg design makes for easier insertion of the legs during assembly and centrally supports the spiral liner, especially in the bend section and ends of the outer down-tube.

The non-cylindrical shape of the inner liner I.D. provides longitudinal pockets for uniform grease retention and distribution along the entire length of the flexible shaft.

The flexible shaft of the invention is useful in devices such as weed trimmers, hand-held snow blowers, power brooms, lawn edgers, hedgers, pruners, chain saws, blowers/vacuums, and automotive applications.

It is an object of the present invention to provide an improved, flexible, rotating drive transmission assembly.

It is another object of this invention to provide a flexible, rotating drive transmission assembly having a spiral-shaped liner that fits easily and snugly within the down-tube.

BRIEF DESCRIPTION OF THE DRAWINGS

A complete understanding of the present invention may be obtained by reference to the accompanying drawings when considered in conjunction with the subsequent detailed description, in which.

For purposes of brevity and clarity, like components and elements of the apparatus of this invention will bear the same designations or numbering throughout the figures.

DESCRIPTION OF THE PREFERRED EMBODIMENT

Generally speaking, the invention features a flexible, rotating drive transmission assembly. The transmission assembly comprises a substantially spiral-shaped liner having a triangular-like cross-section and supporting a flexible shaft. The liner and its center flexible shaft are carried within an outer down-tube. The spiral-shaped liner comprises flexible, continuously tapering elliptical legs that are self-adjusting and allow the liner to be easily inserted and retained into the outer down-tube. The self-adjusting legs of the liner conform to the inside diameter of the outer down-tube despite internal tolerance variations, allowing the liner to maintain both a desirable interference fit and its centerline relative to the centerline of the outer down-tube along the entire length thereof and mating end components.

Figure 1:
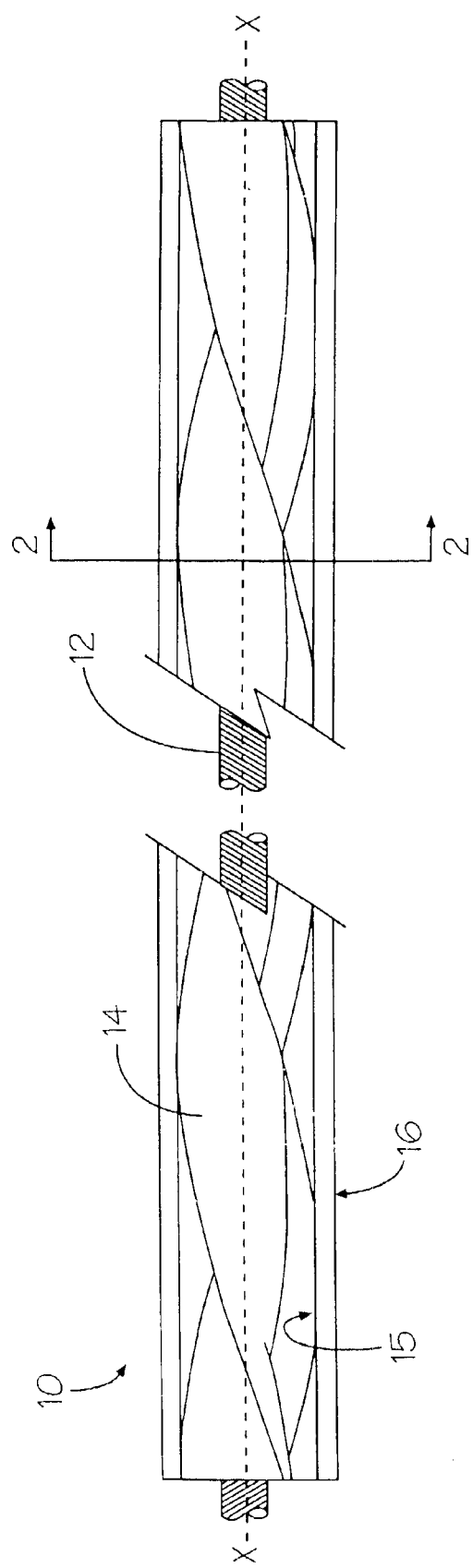
FIG. 1 illustrates a front view of the spiral-shaped liner assembly of this invention.
Figure 2:
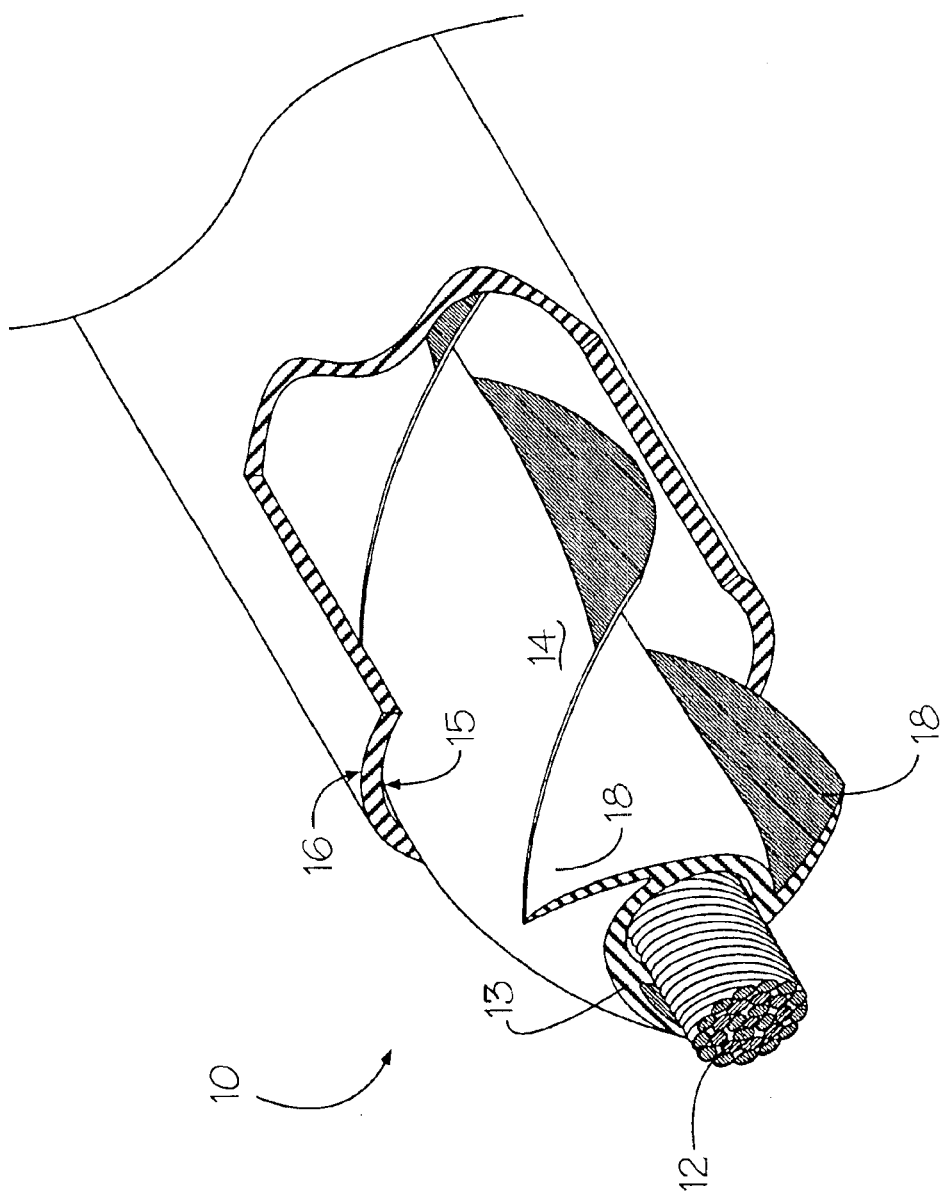
FIG. 2 depicts a section view of the spiral-shaped liner assembly along lines 2—2 of FIG. 1.
Figure 3:
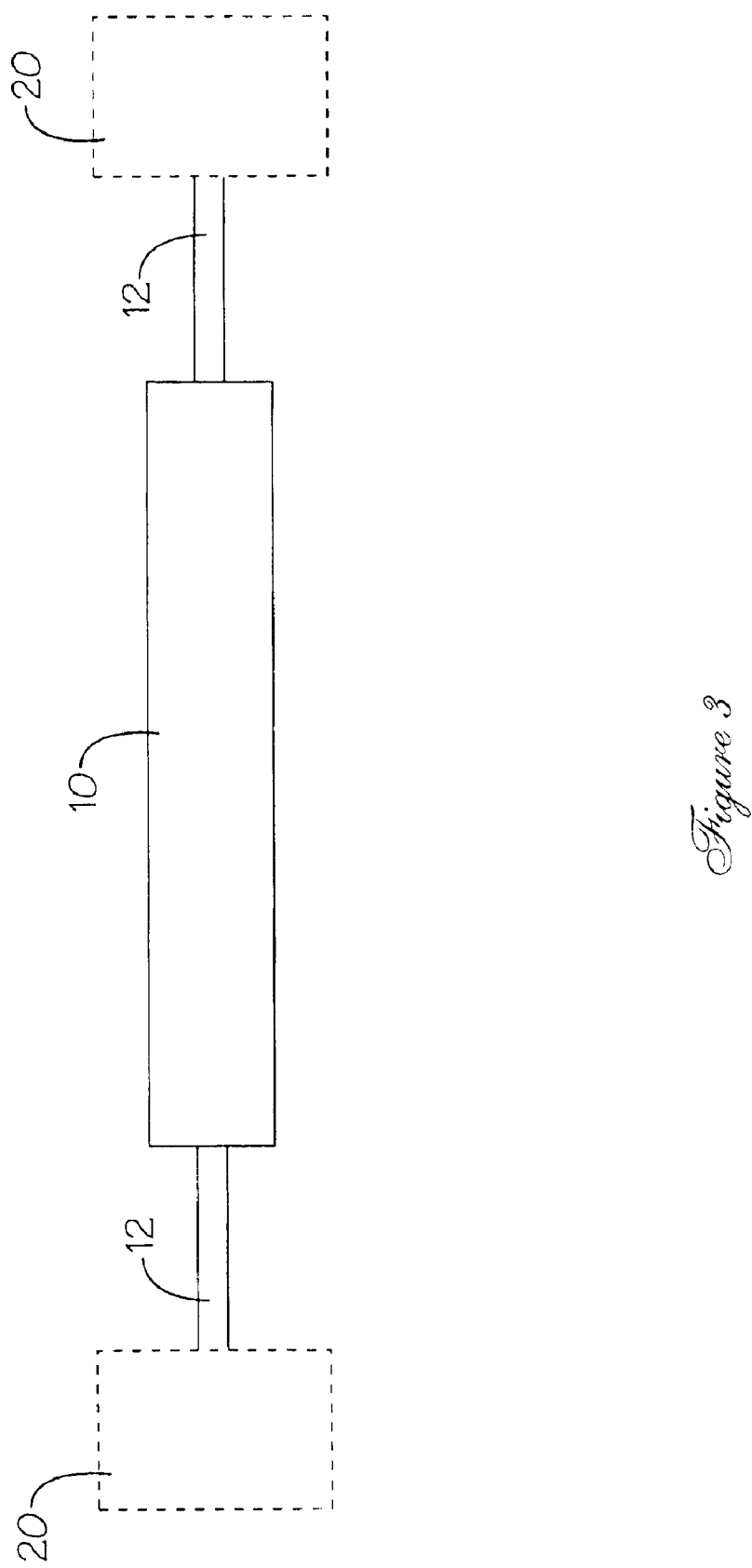
FIG. 3 is a schematic block diagram showing the liner assembly of FIGS. 1 and 2 in its intended operating environment.

Now referring to FIGS. 1 and 2, the flexible, rotating drive transmission assembly 10 of this invention is illustrated. The transmission assembly 10 comprises a rotatable flexible shaft 12 (FIG. 2) supported within a liner 14, supported within an outer down-tube 16. Attached to an inner tube 13 and extending tangentially therefrom are legs 18 of the liner 14 (FIG. 2) which are flexible and easily fit within the outer down-tube 16. The inner tube 13 of liner 14 is approximately triangular in shape. The legs 18 of the liner 14 are self-adjusting and conform to the inside wall 15 of the outer down-tube 16 despite internal tolerance variations and bending along portions of the outer down-tube length, allowing the liner 14 and the flexible shaft 12 to maintain their centerlines X—X relative to the centerline X—X of the outer down-tube 16, which is coincident therewith and with mating end components 20 (FIG. 3) (e.g., motor, cutting head, etc.), not shown. Mating end components 20 represent any device or apparatus known to those skilled in the art as appropriate for attachment to a flexible, rotating drive transmission assembly. These mating end components 20 form no part of the instant invention. Such devices include weed trimmers, hand-held snow blowers, power brooms, lawn edgers, hedgers, pruners, chain saws, and blowers/vacuums.

The elliptical shape of the tapered liner legs 18 allows flexure in the outer down-tube 16 creating a desired interference fit. The placement of the legs 18, emanating tangentially (as opposed to radially) from the outside of the triangular-like inner tube 13, provides a second flexure point. This has a desirable spring effect and vibration dampening effect, both effective and uniform under all tolerance stack-up conditions.

The unique flexibility of the liner 14 provides for axial retention of the liner 14 within the outer down-tube 16, thus eliminating the need for a secondary means of retention. The unique spiral design of liner 14, and its flexible legs 18, center and support the flexible shaft 12, on its intended centerline X—X, preventing parallel misalignment with mating end components 20 (FIG. 3) and therefore eliminates premature failure of the flexible shaft 12.

The unique spiral design of the liner 14 and its legs 18 conforms to the internal diameter of the outer down-tube 16 both at bending and straight portions, preventing distortion of the liner 14. Use of the inventive liner 14 has been shown to improve grease retention along the full length of the liner 14 and provide vibration absorption. The liner 14 can be fabricated of plastic, like nylon and/or polypropylene.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A flexible, rotary drive transmission assembly, comprising a rotatable flexible shaft supported within a central, hollow portion of a cylindrical liner, said liner comprising a plurality of unitary, continuously tapered, flexible, elliptical legs formed from and projecting tangentially from an outer surface thereof thereby defining a boundary line, said boundary line proceeding helically around said outer surface of said cylindrical liner, said liner being carried within an outer down-tube, said legs being disposed in an interference fit with an inner surface thereof, thereby centering and supporting said liner on its intended centerline substantially coaxially with said outer down-tube.

2. A weed trimmer comprising the flexible, rotary drive transmission assembly in accordance with claim 1.

3. The flexible, rotary drive transmission assembly in accordance with claim 1, adapted for use in one of the following devices: weed trimmers, hand-held snow blowers, power brooms, lawn edgers, hedgers, pruners, chain saws, blowers/vacuums and automotive applications.

4. The flexible, rotary drive transmission assembly as recited in claim 1, wherein each of said plurality of tapered, flexible, elliptical legs exhibits both leaf spring and lever spring characteristics.

5. The flexible, rotary drive transmission assembly as recited in claim 4, wherein said leaf spring characteristic is provided by at least said taper of said plurality of tapered, flexible, elliptical legs.

6. The flexible, rotary drive transmission assembly as recited in claim 4, wherein said lever spring characteristic is provided by at least said tangential projection of said plurality of tapered, flexible, elliptical legs.

7. The flexible, rotary drive transmission assembly as recited in claim 4, wherein at least one of said leaf spring and said lever spring characteristics causes said liner to self-center itself in said outer down tube.

8. The flexible, rotary drive transmission assembly as recited in claim 7, wherein said process of said liner self-centering itself in said outer down tube compensates for tolerance variations in an inner surface of said outer down tube.

9. The flexible, rotary drive transmission assembly as recited in claim 4 wherein at least one of said leaf spring and said lever spring characteristics facilitates vibration reduction in said flexible, rotary drive transmission.

10. The flexible, rotary drive transmission assembly as recited in claim 1, wherein said plurality of tapered, flexible, elliptical legs comprises three tapered, flexible, elliptical legs.

11. The flexible, rotary drive transmission assembly as recited in claim 10, wherein a cross-section of said elliptical legs is substantially triangular.

12. The flexible, rotary drive transmission assembly in accordance with claim 1, wherein each of said plurality of tapered, flexible, elliptical legs comprises a peripheral tip at the distal end thereof, disposed helically around said outer surface of said inner liner.

13. The flexible, rotary drive transmission assembly in accordance with claim 1, wherein each of said plurality of tapered, flexible, elliptical legs comprises a peripheral tip at the distal end thereof, and wherein each of said peripheral tips defines a spiral path at a respective point of contact along a length of said inner surface of said outer down tube.

14. A flexible liner carried within an outer down tube of a flexible, rotary drive transmission assembly, said flexible liner comprising a cylindrical, hollow inner tube having a plurality of unitary, continuously tapered, flexible, elliptical legs projecting tangentially from an outer surface thereof wherein said legs wind helically along the length of the hollow inner tube centering and supporting a flexible shaft on its intended centerline within the outer down tube, thus preventing parallel misalignment with end components connected respectively to a proximal and a distal end of said flexible shaft, thereby minimizing premature failure of said rotary drive transmission assembly.

15. The flexible liner for a flexible rotary drive transmission assembly as recited in claim 14, wherein said tapered, flexible, elliptical legs are flexibly self-adjusting, thereby facilitating insertion of said liner into and retention with the outer down-tube.

16. The flexible liner in accordance with claim 15, adapted for use in one of the following devices: weed trimmers, hand-held snow blowers, power brooms, lawn edgers, hedgers, pruners, chain saws, blowers/vacuums and automotive applications.

* * * * *